US012124586B2

United States Patent
Jagad et al.

(10) Patent No.: US 12,124,586 B2
(45) Date of Patent: Oct. 22, 2024

(54) RISK ASSESSMENT FOR MANAGED CLIENT DEVICES

(71) Applicant: VMware, Inc., Palo Alto, CA (US)

(72) Inventors: Pratik Jagad, Marietta, GA (US); Krishna Kumar Bhavesh, Atlanta, GA (US)

(73) Assignee: Omnissa, LLC, Palo Alto, CA (US)

( * ) Notice: Subject to any disclaimer, the term of this patent is extended or adjusted under 35 U.S.C. 154(b) by 0 days.

(21) Appl. No.: 17/483,177

(22) Filed: Sep. 23, 2021

(65) Prior Publication Data

US 2022/0012346 A1 Jan. 13, 2022

Related U.S. Application Data

(63) Continuation of application No. 14/498,115, filed on Sep. 26, 2014, now abandoned.

(60) Provisional application No. 61/943,128, filed on Feb. 21, 2014, provisional application No. 61/877,623, filed on Sep. 13, 2013.

(51) Int. Cl.
  *G06F 21/57* (2013.01)
  *G06F 21/62* (2013.01)
  *H04M 1/725* (2021.01)

(52) U.S. Cl.
  CPC ........ *G06F 21/577* (2013.01); *G06F 21/6245* (2013.01); *G06F 2221/033* (2013.01); *H04M 1/725* (2013.01)

(58) Field of Classification Search
  None
  See application file for complete search history.

(56) References Cited

U.S. PATENT DOCUMENTS

| | | | | |
|---|---|---|---|---|
| 4,961,225 A | * | 10/1990 | Hisano | G06F 13/4204 706/900 |
| 5,005,152 A | * | 4/1991 | Knutsen | G06F 8/53 717/139 |
| 5,278,951 A | * | 1/1994 | Camacho | G06T 1/00 345/440 |
| 5,287,548 A | * | 2/1994 | Flood | G05B 19/056 700/18 |

(Continued)

OTHER PUBLICATIONS

Caralli et al "Introducing Octave Allegro: Improviding the Information Security Risk Assessment Process," May 2007, pp. 1-154 (Year: 2007).*

(Continued)

*Primary Examiner* — Luu T Pham
*Assistant Examiner* — James J Wilcox
(74) *Attorney, Agent, or Firm* — Kim & Stewart LLP

(57) ABSTRACT

Examples of managed device risk assessment are described. In one example, a copy of an application installed on a client device is decompiled, to identify operations performed during execution of the application. A profile including one or more rules that specify whether the operations are assigned higher or lower levels of risk is obtained. A first number of times that the first rule is violated by the operations is determined, and a second number of times that the second rule is violated by the operations is determined. A total of the violations is compared against a threshold, and a remedial action is initiated in response to determining that the total exceeds the threshold.

16 Claims, 6 Drawing Sheets

(56) References Cited

U.S. PATENT DOCUMENTS

| | | | | |
|---|---|---|---|---|
| 5,377,315 A * | 12/1994 | Leggett | G05B 19/056 | 700/12 |
| 5,412,538 A * | 5/1995 | Kikinis | H05K 1/182 | 174/262 |
| 5,546,359 A * | 8/1996 | Aarseth | E21B 47/18 | 367/134 |
| 5,586,328 A * | 12/1996 | Caron | G06F 8/48 | 717/145 |
| 5,615,393 A * | 3/1997 | Kikinis | G06F 3/0485 | 361/679.19 |
| 5,628,031 A * | 5/1997 | Kikinis | G06F 13/409 | 345/173 |
| 5,678,039 A * | 10/1997 | Hinks | G06F 9/454 | |
| 5,819,097 A * | 10/1998 | Brooks | G06F 8/447 | 700/86 |
| 5,841,947 A * | 11/1998 | Nordin | G06N 20/00 | 706/13 |
| 5,854,924 A * | 12/1998 | Rickel | G06F 11/3604 | 714/48 |
| 5,860,008 A * | 1/1999 | Bradley | G06F 8/53 | 717/137 |
| 5,881,290 A * | 3/1999 | Ansari | G06F 8/48 | 717/136 |
| 5,920,720 A | 7/1999 | Toutonghi et al. | | |
| 5,933,498 A * | 8/1999 | Schneck | G06Q 30/018 | 705/54 |
| 5,933,635 A * | 8/1999 | Holzle | G06F 8/443 | 712/E9.084 |
| 5,973,696 A * | 10/1999 | Agranat | G06F 8/38 | 707/E17.118 |
| 5,978,451 A * | 11/1999 | Swan | H04M 1/677 | 379/70 |
| 6,006,328 A * | 12/1999 | Drake | H04L 63/0428 | 713/188 |
| 6,026,235 A | 2/2000 | Shaughnessy | | |
| 6,071,317 A * | 6/2000 | Nagel | G06F 8/78 | 717/131 |
| 6,086,622 A * | 7/2000 | Abe | G06F 11/3624 | 717/134 |
| 6,105,131 A * | 8/2000 | Carroll | H04L 63/0823 | 380/258 |
| 6,151,701 A * | 11/2000 | Humphreys | G06F 8/53 | 717/136 |
| 6,236,969 B1 * | 5/2001 | Ruppert | H04M 1/72502 | 704/275 |
| 6,259,726 B1 * | 7/2001 | Saadeh | H04M 1/733 | 379/90.01 |
| 6,317,873 B1 | 11/2001 | Townsend | | |
| 6,320,962 B1 * | 11/2001 | Eisenbraun | B60R 11/0241 | 379/454 |
| 6,456,308 B1 * | 9/2002 | Agranat | G06F 9/451 | 707/E17.118 |
| 6,546,454 B1 | 4/2003 | Levy et al. | | |
| 6,668,325 B1 * | 12/2003 | Collberg | G06F 21/14 | 726/26 |
| 6,732,168 B1 * | 5/2004 | Bearden | H04L 47/24 | 709/223 |
| 6,804,682 B1 | 10/2004 | Kemper et al. | | |
| 6,968,334 B2 * | 11/2005 | Salmenkaita | G06F 21/51 | |
| 6,973,460 B1 * | 12/2005 | Mitra | G06F 8/74 | |
| 7,020,677 B1 * | 3/2006 | Baillif | G06F 11/1417 | 709/201 |
| 7,370,318 B1 * | 5/2008 | Howe | G06F 8/72 | 717/113 |
| 7,426,721 B1 * | 9/2008 | Saulpaugh | H04L 67/51 | 718/1 |
| 7,467,142 B2 * | 12/2008 | Sinn | G06F 21/6245 | 709/227 |
| 7,478,435 B2 * | 1/2009 | Sueyoshi | G06F 9/44536 | 726/27 |
| 7,676,791 B2 * | 3/2010 | Hamby | G06F 9/52 | 719/314 |
| 7,680,819 B1 * | 3/2010 | Mellmer | H04L 63/104 | 713/182 |
| 7,693,970 B2 * | 4/2010 | Eidler | H04L 63/10 | 709/223 |
| 7,735,127 B1 * | 6/2010 | Rive | H04L 63/0209 | 726/22 |
| 7,743,336 B2 * | 6/2010 | Louch | G06F 21/552 | 715/766 |
| 7,765,539 B1 * | 7/2010 | Elliott | G06F 8/76 | 717/145 |
| 7,797,733 B1 * | 9/2010 | Sallam | H04L 63/1416 | 726/4 |
| 7,823,145 B1 * | 10/2010 | Le | G06F 21/577 | 717/168 |
| 7,840,951 B1 * | 11/2010 | Wright | G06F 9/45516 | 717/148 |
| 7,890,869 B1 * | 2/2011 | Mayer | G06F 21/577 | 709/224 |
| 7,891,000 B1 | 2/2011 | Rangamani et al. | | |
| 7,899,722 B1 * | 3/2011 | Lawrence | G06Q 40/08 | 705/37 |
| 7,930,411 B1 * | 4/2011 | Hayward | H04L 63/0815 | 709/229 |
| 7,934,248 B1 * | 4/2011 | Yehuda | H04L 63/20 | 713/153 |
| 7,937,757 B2 * | 5/2011 | Focke | G06F 9/45537 | 726/28 |
| 7,945,958 B2 * | 5/2011 | Amarasinghe | G06F 21/54 | 726/25 |
| 7,962,961 B1 * | 6/2011 | Griffin | G06F 21/577 | 709/224 |
| 7,975,256 B2 * | 7/2011 | Atkin | G06F 8/443 | 717/122 |
| 7,996,373 B1 * | 8/2011 | Zoppas | G06F 21/554 | 707/694 |
| 8,041,749 B2 * | 10/2011 | Beck | G16H 50/20 | 707/706 |
| 8,055,904 B1 * | 11/2011 | Cato | G06F 21/554 | 705/72 |
| 8,095,643 B2 * | 1/2012 | Goto | H04L 67/306 | 709/224 |
| 8,224,840 B2 * | 7/2012 | Bao | G06F 16/951 | 707/769 |
| 8,272,061 B1 * | 9/2012 | Lotem | H04L 63/1416 | 709/224 |
| 8,332,908 B2 * | 12/2012 | Hatakeyama | G06F 21/6245 | 726/1 |
| 8,406,141 B1 * | 3/2013 | Couturier | G06F 16/951 | 370/241 |
| 8,489,609 B1 * | 7/2013 | Ong | H04N 21/23109 | 707/913 |
| 8,499,355 B1 * | 7/2013 | Goncharov | G06F 21/577 | 726/25 |
| 8,561,180 B1 * | 10/2013 | Nachenberg | G06F 21/562 | 726/22 |
| 8,578,339 B2 * | 11/2013 | Day | G06F 8/52 | 717/130 |
| 8,607,340 B2 * | 12/2013 | Wright | G06F 21/552 | 726/22 |
| 8,621,550 B1 * | 12/2013 | Yehuda | H04L 43/50 | 713/168 |
| 8,621,636 B2 * | 12/2013 | Bailey, Jr. | G06F 21/577 | 726/25 |
| 8,677,507 B2 * | 3/2014 | Ginter | H04L 9/3247 | 380/231 |
| 8,756,698 B2 * | 6/2014 | Sidagni | G06F 21/577 | 709/200 |
| 8,832,259 B1 * | 9/2014 | Kearns | H04L 63/1441 | 713/153 |
| 8,849,685 B2 * | 9/2014 | Oden | G06Q 10/1095 | 705/7.11 |
| 8,892,875 B1 * | 11/2014 | Baldwin | H04L 9/3268 | 713/188 |
| 8,949,991 B2 * | 2/2015 | Beskrovny | G06F 21/562 | 726/25 |

(56) References Cited

U.S. PATENT DOCUMENTS

| | | | | |
|---|---|---|---|---|
| 8,955,038 B2* | 2/2015 | Nicodemus | H04L 63/1416 | 717/172 |
| 9,015,706 B2* | 4/2015 | Conover | G06F 21/577 | 718/1 |
| 9,027,004 B1* | 5/2015 | Johnson | G06F 8/53 | 717/148 |
| 9,043,480 B2* | 5/2015 | Barton | H04W 12/06 | 709/229 |
| 9,043,793 B1* | 5/2015 | Field | G06Q 10/10 | 718/100 |
| 9,185,554 B2* | 11/2015 | Nagpal | H04L 67/34 | |
| 9,274,930 B2* | 3/2016 | Morrison | G06F 11/3628 | |
| 9,282,114 B1* | 3/2016 | Dotan | G06F 21/577 | |
| 9,298,925 B1* | 3/2016 | Crittall | G06F 21/577 | |
| 9,426,169 B2* | 8/2016 | Zandani | G06F 21/57 | |
| 9,489,697 B1* | 11/2016 | Guerrieri | G06Q 40/10 | |
| 9,569,201 B1* | 2/2017 | Lotem | G06F 8/70 | |
| 9,578,137 B1* | 2/2017 | Sham | G06F 11/3438 | |
| 9,665,393 B1* | 5/2017 | Johnson | G06F 21/604 | |
| 9,697,019 B1* | 7/2017 | Fitzgerald | H04L 41/08 | |
| 9,747,185 B2* | 8/2017 | Fine | G06F 11/3409 | |
| 9,779,250 B1* | 10/2017 | Hui | G06F 21/577 | |
| 9,779,253 B2* | 10/2017 | Mahaffey | H04L 63/123 | |
| 9,824,224 B2* | 11/2017 | Furuichi | G06F 21/6245 | |
| 9,928,379 B1* | 3/2018 | Hoffer | G16H 50/20 | |
| 9,934,384 B2* | 4/2018 | Johansson | G06F 21/577 | |
| 9,971,891 B2* | 5/2018 | Bowen | H04L 63/1491 | |
| 10,042,658 B1* | 8/2018 | Day | H04L 43/14 | |
| 2001/0041594 A1* | 11/2001 | Arazi | H04W 8/005 | 455/555 |
| 2001/0046850 A1* | 11/2001 | Blanke | H04M 1/72502 | 455/411 |
| 2002/0004909 A1* | 1/2002 | Hirano | G06F 21/6245 | 707/999.009 |
| 2002/0010679 A1* | 1/2002 | Felsher | G06F 21/6245 | 705/51 |
| 2002/0016184 A1* | 2/2002 | Helaine | H04W 84/16 | 455/553.1 |
| 2002/0023212 A1* | 2/2002 | Proudler | H04L 63/08 | 714/E11.204 |
| 2002/0038428 A1* | 3/2002 | Safa | G06F 21/125 | 713/190 |
| 2002/0147735 A1 | 10/2002 | Nir | | |
| 2003/0004965 A1* | 1/2003 | Farmer | G16C 20/90 | |
| 2003/0023961 A1* | 1/2003 | Barsness | G06F 8/443 | 717/152 |
| 2003/0037103 A1* | 2/2003 | Salmi | H04L 51/04 | 709/229 |
| 2003/0084294 A1* | 5/2003 | Aoshima | H04L 9/3263 | 713/169 |
| 2003/0177363 A1* | 9/2003 | Yokota | H04L 9/0866 | 713/176 |
| 2003/0225693 A1* | 12/2003 | Ballard | G06Q 20/108 | 705/42 |
| 2004/0039728 A1* | 2/2004 | Fenlon | H04L 41/0681 | |
| 2004/0090949 A1* | 5/2004 | So | H04L 12/2898 | 370/352 |
| 2004/0098749 A1* | 5/2004 | Sansom | H04N 21/235 | 348/E7.071 |
| 2004/0103000 A1* | 5/2004 | Owurowa | G06F 21/6245 | 705/50 |
| 2004/0111713 A1* | 6/2004 | Rioux | G06F 8/427 | 717/145 |
| 2004/0228613 A1* | 11/2004 | Lin | G06F 3/04845 | 386/E5.072 |
| 2004/0236694 A1* | 11/2004 | Tattan | G06Q 20/027 | 705/50 |
| 2005/0010442 A1* | 1/2005 | Kragh | G16H 70/60 | 705/2 |
| 2005/0015667 A1* | 1/2005 | Aaron | G06F 21/577 | 714/25 |
| 2005/0026651 A1* | 2/2005 | Chen | H04M 1/72513 | 455/66.1 |
| 2005/0027784 A1* | 2/2005 | Fusari | G06F 21/6245 | 709/200 |
| 2005/0066165 A1* | 3/2005 | Peled | G06F 21/6245 | 713/165 |
| 2005/0076209 A1* | 4/2005 | Proudler | G06F 21/6245 | 713/165 |
| 2005/0079478 A1* | 4/2005 | McKeagney | G09B 19/0053 | 434/350 |
| 2005/0102534 A1* | 5/2005 | Wong | G06F 21/577 | 726/4 |
| 2005/0114784 A1* | 5/2005 | Spring | H04L 67/5682 | 715/202 |
| 2005/0130721 A1* | 6/2005 | Gartrell | H04M 1/0283 | 455/575.8 |
| 2005/0132225 A1* | 6/2005 | Gearhart | G06F 21/577 | 726/4 |
| 2005/0138413 A1* | 6/2005 | Lippmann | H04L 63/1433 | 726/4 |
| 2005/0144475 A1* | 6/2005 | Sakaki | H04L 63/20 | 713/189 |
| 2005/0147240 A1* | 7/2005 | Agrawal | G06F 21/60 | 380/28 |
| 2005/0148358 A1* | 7/2005 | Lin | G06F 21/554 | 455/550.1 |
| 2005/0228687 A1* | 10/2005 | Houtani | G06F 21/645 | 455/411 |
| 2005/0229256 A2* | 10/2005 | Banzhof | G06F 21/577 | 726/25 |
| 2005/0251863 A1* | 11/2005 | Sima | G06F 21/577 | 726/25 |
| 2005/0273854 A1* | 12/2005 | Chess | G06F 21/577 | 713/188 |
| 2005/0273859 A1* | 12/2005 | Chess | G06F 21/577 | 726/25 |
| 2005/0273860 A1* | 12/2005 | Chess | G06F 21/577 | 726/25 |
| 2005/0273861 A1* | 12/2005 | Chess | G06F 21/577 | 726/25 |
| 2005/0278714 A1* | 12/2005 | Vahid | G06F 8/53 | 717/159 |
| 2006/0021046 A1* | 1/2006 | Cook | G06F 21/577 | 726/25 |
| 2006/0021048 A1* | 1/2006 | Cook | H04L 63/1433 | 726/25 |
| 2006/0021049 A1* | 1/2006 | Cook | G06F 21/577 | 726/25 |
| 2006/0021050 A1* | 1/2006 | Cook | H04L 63/1433 | 726/25 |
| 2006/0026042 A1* | 2/2006 | Awaraji | G06F 21/6245 | 707/999.009 |
| 2006/0047758 A1* | 3/2006 | Sharma | H04L 67/56 | 709/206 |
| 2006/0053134 A1* | 3/2006 | Durham | G06F 21/577 | |
| 2006/0053265 A1* | 3/2006 | Durham | G06F 16/258 | 711/163 |
| 2006/0069688 A1* | 3/2006 | Shekar | G06F 16/20 | |
| 2006/0080284 A1* | 4/2006 | Masonis | H04L 12/185 | |
| 2006/0085852 A1* | 4/2006 | Sima | G06F 21/577 | 726/22 |
| 2006/0129830 A1* | 6/2006 | Haller | G06F 21/602 | 713/183 |
| 2006/0155764 A1* | 7/2006 | Tao | G06F 16/955 | 707/E17.112 |
| 2006/0156022 A1* | 7/2006 | Grim, III | G06F 21/6263 | 713/182 |
| 2006/0161750 A1* | 7/2006 | Perkins | H04L 9/321 | 711/164 |
| 2006/0174350 A1* | 8/2006 | Roever | H04L 12/1822 | 726/27 |
| 2006/0178997 A1* | 8/2006 | Schneck | G06Q 99/00 | 705/50 |
| 2006/0184666 A1* | 8/2006 | Nozawa | G06F 21/6245 | 709/224 |
| 2006/0184829 A1* | 8/2006 | Cheong | G06F 11/3604 | 714/39 |
| 2006/0212464 A1* | 9/2006 | Pedersen | G06F 21/55 | |

(56) References Cited

U.S. PATENT DOCUMENTS

| | | | |
|---|---|---|---|
| 2006/0252544 A1* | 11/2006 | Liu | H04L 67/131 463/39 |
| 2006/0253709 A1* | 11/2006 | Cheng | H04L 63/105 713/182 |
| 2006/0265348 A1* | 11/2006 | Weerman | G06Q 30/02 |
| 2006/0272024 A1* | 11/2006 | Huang | H04L 67/535 726/26 |
| 2006/0277539 A1* | 12/2006 | Amarasinghe | G06F 21/54 717/168 |
| 2007/0038781 A1* | 2/2007 | Joung | H04L 65/764 375/E7.006 |
| 2007/0050216 A1* | 3/2007 | Wright | G16H 10/65 705/3 |
| 2007/0055666 A1* | 3/2007 | Newbould | G06Q 30/02 707/999.009 |
| 2007/0064943 A1* | 3/2007 | Ginter | H04N 21/25816 380/233 |
| 2007/0067450 A1 | 3/2007 | Malloy et al. | |
| 2007/0078988 A1 | 4/2007 | Miloushev et al. | |
| 2007/0088753 A1* | 4/2007 | Omoto | G16H 20/60 |
| 2007/0101432 A1* | 5/2007 | Carpenter | G06F 21/552 726/25 |
| 2007/0143851 A1* | 6/2007 | Nicodemus | H04L 63/1433 726/4 |
| 2007/0168998 A1* | 7/2007 | Mehta | G06F 11/3676 717/130 |
| 2007/0174490 A1* | 7/2007 | Choi | G06Q 30/02 707/E17.116 |
| 2007/0180490 A1* | 8/2007 | Renzi | G06F 21/604 726/1 |
| 2007/0192863 A1* | 8/2007 | Kapoor | H04L 67/10 726/23 |
| 2007/0199050 A1* | 8/2007 | Meier | H04L 67/02 726/4 |
| 2007/0226794 A1* | 9/2007 | Howcroft | H04N 21/442 348/E5.006 |
| 2007/0226796 A1* | 9/2007 | Gilbert | G06F 21/577 726/25 |
| 2007/0234070 A1* | 10/2007 | Horning | G06F 21/14 713/190 |
| 2007/0240138 A1* | 10/2007 | Chess | G06F 21/577 717/143 |
| 2007/0294766 A1* | 12/2007 | Mir | G06Q 10/06 726/23 |
| 2008/0016410 A1* | 1/2008 | Pu | G06F 21/64 714/47.2 |
| 2008/0018518 A1* | 1/2008 | Chan | H04N 5/765 341/176 |
| 2008/0040774 A1* | 2/2008 | Wang | G06F 21/604 726/1 |
| 2008/0047016 A1* | 2/2008 | Spoonamore | G06Q 10/06 726/25 |
| 2008/0051076 A1 | 2/2008 | O'Shaughnessy et al. | |
| 2008/0059269 A1* | 3/2008 | Willis | G06Q 10/06316 705/7.26 |
| 2008/0072325 A1* | 3/2008 | Repasi | H04L 63/1416 726/23 |
| 2008/0080718 A1* | 4/2008 | Meijer | H04L 9/083 380/282 |
| 2008/0082538 A1* | 4/2008 | Meijer | G06F 16/27 707/999.009 |
| 2008/0098479 A1* | 4/2008 | O'Rourke | H04L 63/1433 726/25 |
| 2008/0104276 A1* | 5/2008 | Lahoti | G06F 21/6218 709/245 |
| 2008/0104393 A1* | 5/2008 | Glasser | G06F 16/27 713/165 |
| 2008/0120611 A1 | 5/2008 | Aaron | |
| 2008/0134156 A1 | 6/2008 | Osminer et al. | |
| 2008/0134177 A1* | 6/2008 | Fitzgerald | G06F 9/45533 718/1 |
| 2008/0139191 A1* | 6/2008 | Melnyk | H04L 67/565 707/E17.121 |
| 2008/0148056 A1* | 6/2008 | Ginter | H04N 21/25875 713/168 |
| 2008/0163373 A1* | 7/2008 | Maynard | H04L 63/0209 726/25 |
| 2008/0168135 A1* | 7/2008 | Redlich | G06F 16/282 709/204 |
| 2008/0168529 A1* | 7/2008 | Anderson | G06F 21/577 726/1 |
| 2008/0178300 A1* | 7/2008 | Brown | H04W 12/033 726/29 |
| 2008/0184203 A1* | 7/2008 | Yan | G06F 21/577 717/126 |
| 2008/0189250 A1* | 8/2008 | Cha | G06F 21/10 707/999.009 |
| 2008/0209395 A1* | 8/2008 | Ernst | G06F 8/52 717/115 |
| 2008/0209401 A1* | 8/2008 | Fanning | G06F 8/53 717/124 |
| 2008/0215968 A1* | 9/2008 | Bekerman | G06F 8/53 715/255 |
| 2008/0222734 A1* | 9/2008 | Redlich | H04L 9/3271 726/26 |
| 2008/0229422 A1* | 9/2008 | Hudis | H04L 41/0894 726/25 |
| 2008/0262990 A1* | 10/2008 | Kapoor | H04L 63/145 706/20 |
| 2009/0006575 A1* | 1/2009 | Hulten | G06F 21/577 709/204 |
| 2009/0036159 A1* | 2/2009 | Chen | H04Q 11/0478 455/556.1 |
| 2009/0077666 A1* | 3/2009 | Chen | G06Q 10/0631 726/25 |
| 2009/0103735 A1* | 4/2009 | Aizu | G16H 40/67 380/278 |
| 2009/0113550 A1* | 4/2009 | Costa | G06F 21/55 726/25 |
| 2009/0120653 A1* | 5/2009 | Thomas | A62C 5/02 169/61 |
| 2009/0144827 A1* | 6/2009 | Peinado | G06F 21/577 726/25 |
| 2009/0151007 A1* | 6/2009 | Koster | G06F 21/10 726/30 |
| 2009/0157869 A1* | 6/2009 | Cleary | H04L 67/104 709/224 |
| 2009/0158302 A1* | 6/2009 | Nicodemus | G06F 21/577 726/6 |
| 2009/0165103 A1* | 6/2009 | Cho | G06F 21/6245 726/6 |
| 2009/0172650 A1* | 7/2009 | Spurlin | G06F 8/53 717/144 |
| 2009/0172651 A1* | 7/2009 | Need | G06F 8/658 717/136 |
| 2009/0217381 A1* | 8/2009 | Helman | G06F 21/577 726/25 |
| 2009/0228439 A1 | 9/2009 | Manolescu et al. | |
| 2009/0265761 A1* | 10/2009 | Evanitsky | G06Q 50/16 707/999.01 |
| 2009/0265762 A1* | 10/2009 | Evanitsky | G06F 16/955 709/201 |
| 2009/0271863 A1* | 10/2009 | Govindavajhala | G06F 21/577 726/25 |
| 2009/0276860 A1* | 11/2009 | Miyabashi | G06F 21/6245 726/30 |
| 2009/0291636 A1* | 11/2009 | Morley-Smith | H04W 64/00 455/556.1 |
| 2009/0300747 A1* | 12/2009 | Ahn | G06F 21/6245 726/9 |
| 2009/0307764 A1* | 12/2009 | Isobe | H04L 9/3231 726/25 |
| 2010/0082441 A1* | 4/2010 | Doemling | G06Q 30/0276 705/14.72 |
| 2010/0083240 A1* | 4/2010 | Siman | G06F 16/245 717/144 |
| 2010/0095277 A1 | 4/2010 | Cheng et al. | |

(56) References Cited

U.S. PATENT DOCUMENTS

| | | | |
|---|---|---|---|
| 2010/0095381 A1* | 4/2010 | Levi | H04L 63/1433 726/25 |
| 2010/0125911 A1* | 5/2010 | Bhaskaran | G06Q 10/10 715/781 |
| 2010/0161816 A1* | 6/2010 | Kraft | G06Q 30/02 709/229 |
| 2010/0189606 A1* | 7/2010 | Burleson | C01B 3/0094 96/204 |
| 2010/0192228 A1* | 7/2010 | Levi | G06F 21/577 726/25 |
| 2010/0205657 A1* | 8/2010 | Manring | G06Q 10/10 715/781 |
| 2010/0218233 A1* | 8/2010 | Henderson | H04L 63/20 726/1 |
| 2010/0241595 A1* | 9/2010 | Felsher | G16H 10/65 707/E17.014 |
| 2010/0245585 A1* | 9/2010 | Fisher | H04N 7/18 348/240.99 |
| 2010/0250603 A1* | 9/2010 | Balakrishnaiah | H04L 9/3234 707/E17.014 |
| 2010/0287054 A1* | 11/2010 | Zohar | G06Q 30/0276 705/14.72 |
| 2010/0313188 A1* | 12/2010 | Asipov | G06F 21/14 717/139 |
| 2010/0325412 A1* | 12/2010 | Norrman | G06Q 10/06 726/25 |
| 2011/0023022 A1* | 1/2011 | Harper | G06F 8/36 717/170 |
| 2011/0023115 A1* | 1/2011 | Wright | G06F 21/552 726/22 |
| 2011/0069839 A1* | 3/2011 | Tsuruoka | G06F 21/6245 380/279 |
| 2011/0093954 A1* | 4/2011 | Lee | H04L 63/1433 709/224 |
| 2011/0111764 A1* | 5/2011 | Mueck | H04W 72/542 455/67.7 |
| 2011/0126111 A1* | 5/2011 | Gill | G06F 21/577 715/736 |
| 2011/0131658 A1* | 6/2011 | Bahl | G06F 21/577 726/25 |
| 2011/0145894 A1* | 6/2011 | Garcia Morchon | H04L 63/062 726/4 |
| 2011/0154121 A1* | 6/2011 | Dern | G06F 11/3684 717/124 |
| 2011/0176493 A1* | 7/2011 | Kiiskila | H04W 76/15 370/328 |
| 2011/0185431 A1* | 7/2011 | Deraison | G06F 21/577 726/25 |
| 2011/0197174 A1* | 8/2011 | Wu | G06F 8/53 717/104 |
| 2011/0208785 A1* | 8/2011 | Burke | G06F 8/00 707/E17.005 |
| 2011/0209196 A1* | 8/2011 | Kennedy | H04L 63/101 726/1 |
| 2011/0209207 A1* | 8/2011 | Issa | G06F 21/577 709/206 |
| 2011/0231361 A1* | 9/2011 | Patchava | G06F 21/577 707/602 |
| 2011/0231408 A1* | 9/2011 | Sasaki | G06F 21/6245 707/748 |
| 2011/0269424 A1* | 11/2011 | Multer | H04L 67/1095 455/411 |
| 2011/0302564 A1* | 12/2011 | Byers | G06F 8/36 717/137 |
| 2011/0302634 A1* | 12/2011 | Karaoguz | H04N 21/632 726/4 |
| 2011/0320286 A1* | 12/2011 | Zohar | G06Q 30/0276 705/14.72 |
| 2012/0017205 A1 | 1/2012 | Mahajan et al. | |
| 2012/0023547 A1* | 1/2012 | Maxson | H04L 63/0407 726/1 |
| 2012/0054136 A1* | 3/2012 | Maulik | G06Q 10/06 706/14 |
| 2012/0066508 A1* | 3/2012 | Lentini | G06F 21/6245 713/186 |
| 2012/0066745 A1* | 3/2012 | Wuthnow | H04L 63/10 726/4 |
| 2012/0095922 A1* | 4/2012 | Wada | G06Q 30/0601 705/26.1 |
| 2012/0109784 A1* | 5/2012 | Marion | G06Q 30/0601 380/279 |
| 2012/0110444 A1* | 5/2012 | Li | G06F 40/157 715/709 |
| 2012/0110671 A1* | 5/2012 | Beresnevichiene | G06F 8/10 726/25 |
| 2012/0136961 A1* | 5/2012 | Chen | H05B 47/175 315/129 |
| 2012/0137343 A1* | 5/2012 | Uchida | G06F 21/6245 726/1 |
| 2012/0137372 A1* | 5/2012 | Shin | H04L 9/0897 726/26 |
| 2012/0150773 A1* | 6/2012 | DiCorpo | G06N 20/00 706/12 |
| 2012/0159567 A1* | 6/2012 | Toy | G06F 21/6245 726/1 |
| 2012/0159619 A1* | 6/2012 | Berg | G06F 21/50 726/22 |
| 2012/0192247 A1* | 7/2012 | Oliver | G06F 21/6245 726/1 |
| 2012/0203649 A1* | 8/2012 | Mishura | G06F 21/78 705/26.1 |
| 2012/0210443 A1* | 8/2012 | Blaisdell | H04W 12/37 726/27 |
| 2012/0216243 A1* | 8/2012 | Gill | G06F 21/55 726/1 |
| 2012/0222083 A1* | 8/2012 | Vaha-Sipila | G06F 21/6245 726/1 |
| 2012/0224057 A1* | 9/2012 | Gill | G06F 21/577 348/143 |
| 2012/0233601 A1* | 9/2012 | Gounares | G06F 8/443 717/145 |
| 2012/0246484 A1* | 9/2012 | Blaisdell | H04W 12/37 713/189 |
| 2012/0251073 A1* | 10/2012 | Innocenti | H04N 21/812 386/E9.011 |
| 2012/0290576 A1* | 11/2012 | Amorim | G06F 16/258 707/E17.046 |
| 2012/0297380 A1 | 11/2012 | Colbert et al. | |
| 2012/0311071 A1* | 12/2012 | Karaffa | G05B 19/41845 709/217 |
| 2012/0317627 A1* | 12/2012 | Chandrashekhar | H04L 63/1433 726/4 |
| 2012/0330786 A1* | 12/2012 | Paleja | G06F 21/125 709/217 |
| 2013/0055401 A1* | 2/2013 | Kim | G06F 21/52 726/25 |
| 2013/0086376 A1* | 4/2013 | Haynes | G06F 21/577 713/150 |
| 2013/0086685 A1* | 4/2013 | Haynes | H04L 63/1433 726/25 |
| 2013/0086686 A1* | 4/2013 | Pistoia | G06F 21/00 726/25 |
| 2013/0086688 A1* | 4/2013 | Patel | H04L 63/1433 726/25 |
| 2013/0091541 A1* | 4/2013 | Beskrovny | G06F 11/3688 726/1 |
| 2013/0091578 A1* | 4/2013 | Bisht | G06F 21/53 726/25 |
| 2013/0097659 A1* | 4/2013 | Das | G06F 21/51 726/1 |
| 2013/0097660 A1* | 4/2013 | Das | H04L 63/205 726/1 |
| 2013/0097662 A1* | 4/2013 | Pearcy | H04L 63/20 726/1 |
| 2013/0111546 A1* | 5/2013 | Gargiulo | H04W 12/04 726/1 |

(56) References Cited

U.S. PATENT DOCUMENTS

| | | | |
|---|---|---|---|
| 2013/0111548 A1* | 5/2013 | Kanoun | G06F 21/577 726/1 |
| 2013/0111592 A1* | 5/2013 | Zhu | G06F 21/577 726/25 |
| 2013/0132942 A1* | 5/2013 | Wang | G06F 9/45504 717/176 |
| 2013/0160120 A1* | 6/2013 | Malaviya | G06F 21/552 726/23 |
| 2013/0160141 A1* | 6/2013 | Tseng | H04W 4/21 726/28 |
| 2013/0174246 A1* | 7/2013 | Schrecker | H04L 63/1433 726/14 |
| 2013/0179991 A1* | 7/2013 | White | G06F 21/53 726/29 |
| 2013/0185804 A1* | 7/2013 | Biswas | G06F 21/577 726/26 |
| 2013/0185806 A1* | 7/2013 | Hatakeyama | H04L 63/20 726/27 |
| 2013/0219493 A1* | 8/2013 | Banzhof | G06F 21/567 726/22 |
| 2013/0227524 A1 | 8/2013 | Im et al. | |
| 2013/0227683 A1* | 8/2013 | Bettini | G06F 21/577 726/22 |
| 2013/0227697 A1* | 8/2013 | Zandani | G06F 21/57 726/25 |
| 2013/0239167 A1* | 9/2013 | Sreenivas | G06F 21/577 726/1 |
| 2013/0239168 A1* | 9/2013 | Sreenivas | G06F 21/57 726/1 |
| 2013/0246370 A1* | 9/2013 | Bartram | G06F 21/577 717/136 |
| 2013/0247136 A1* | 9/2013 | Chieu | G06F 21/577 726/1 |
| 2013/0254833 A1* | 9/2013 | Nicodemus | G06F 21/577 726/1 |
| 2013/0254889 A1* | 9/2013 | Stuntebeck | G06F 21/565 726/23 |
| 2013/0263289 A1* | 10/2013 | Vijayan | G06F 16/1748 726/31 |
| 2013/0268994 A1* | 10/2013 | Cooper | H04L 63/20 726/1 |
| 2013/0268997 A1* | 10/2013 | Clancy, III | H04L 63/0227 726/1 |
| 2013/0283336 A1* | 10/2013 | Macy | G06F 21/577 726/1 |
| 2013/0287208 A1 | 10/2013 | Chong et al. | |
| 2013/0291106 A1* | 10/2013 | Simonoff | G06F 21/577 726/23 |
| 2013/0312103 A1* | 11/2013 | Brumley | G06F 21/577 726/25 |
| 2013/0326499 A1* | 12/2013 | Mowatt | G06F 8/60 717/176 |
| 2013/0329968 A1* | 12/2013 | Ranjan | G06F 21/6245 382/118 |
| 2013/0333033 A1* | 12/2013 | Khesin | G06F 21/55 726/23 |
| 2013/0347094 A1* | 12/2013 | Bettini | H04L 63/1433 726/11 |
| 2013/0347111 A1* | 12/2013 | Karta | H04L 63/1441 726/23 |
| 2013/0347118 A1* | 12/2013 | Yi | G06F 21/50 726/26 |
| 2014/0032759 A1* | 1/2014 | Barton | H04W 12/08 709/225 |
| 2014/0047545 A1* | 2/2014 | Sidagni | G06F 21/577 726/25 |
| 2014/0047546 A1* | 2/2014 | Sidagni | G06F 21/577 726/25 |
| 2014/0068257 A1* | 3/2014 | Burckard | G06Q 50/06 713/166 |
| 2014/0068776 A1 | 3/2014 | Xiao et al. | |
| 2014/0082748 A1* | 3/2014 | Gomi | G06F 21/6245 726/28 |
| 2014/0109238 A1* | 4/2014 | Ravindran | G06F 21/6245 726/27 |
| 2014/0137088 A1* | 5/2014 | Mitchell | G06F 8/53 717/143 |
| 2014/0157355 A1* | 6/2014 | Clancy, III | H04W 12/08 726/1 |
| 2014/0236624 A1* | 8/2014 | Kim | H04L 63/04 705/3 |
| 2014/0241348 A1* | 8/2014 | Yadav | H04L 45/56 370/389 |
| 2014/0245439 A1* | 8/2014 | Day | H04L 63/1441 726/23 |
| 2014/0281511 A1* | 9/2014 | Kaushik | H04L 63/062 713/164 |
| 2014/0331317 A1 | 11/2014 | Singh | |
| 2014/0344061 A1* | 11/2014 | Choi | G06Q 30/0267 705/14.66 |
| 2014/0351571 A1* | 11/2014 | Jacobs | G06F 21/51 713/2 |
| 2014/0379664 A1* | 12/2014 | Wiegenstein | G06F 11/3006 707/687 |
| 2015/0033339 A1* | 1/2015 | Geffner | G06F 21/56 726/23 |
| 2015/0040112 A1* | 2/2015 | Valencia | G06F 8/65 717/168 |
| 2015/0040229 A1* | 2/2015 | Chan | G06F 21/577 726/25 |
| 2015/0058166 A1* | 2/2015 | Dion | G06Q 30/0613 705/26.41 |
| 2015/0106384 A1 | 4/2015 | Go et al. | |
| 2015/0127829 A1 | 5/2015 | Biswas | |
| 2015/0143528 A1* | 5/2015 | Johansson | H04L 63/0876 726/25 |
| 2015/0200959 A1 | 7/2015 | Adam et al. | |
| 2015/0207809 A1* | 7/2015 | Macaulay | G06F 21/577 726/22 |
| 2015/0212805 A1* | 7/2015 | Zhu | G06F 9/30098 717/136 |
| 2016/0132694 A1 | 5/2016 | Dhoolia et al. | |
| 2017/0103215 A1* | 4/2017 | Mahaffey | H04L 63/1433 |
| 2022/0012346 A1* | 1/2022 | Jagad | G06F 21/577 |

OTHER PUBLICATIONS

Ray et al "Assembly and Disassembly," p. 1, Jul. 11, 2010 retrieved from https://web.archive.org/web/20100711172121/https:/cs.lmu.edu/~ray/notes/assemdisassem/ (Year: 2010).*

Chen et al "Cloud Licensing Model for .NET Software Protection," The 7th International Conference on Computer Science & Education (ICCSE 2012), Melbourne Australia, IEEE, pp. 1069-1074 (Year: 2012).*

Falcarin et al "Remote Trust with Aspect-Oriented Programming," Proceedings of the 20th International Conference on Advanced Information Networking and Applications (AINA '06), IEEE Computer Society, pp. 1-6 (Year: 2006).*

Marosi et al "GenWrapper: A Generic Wrapper for Running Legacy Applications on Desktop Grids," IEEE, pp. 1-9 (Year: 2009).*

Zhao et al "An Agent Based Wrapper Mechanism Used in System Integration," IEEE International Conference on e-Business Engineering, IEEE Computer Society, pp. 637-640 (Year: 2008).*

Avdoshin et al "Software Risk Management," IEEE, pp. 1-6 (Year: 2011).*

Lobato et al "Risk Management in Software Product Lines: An Industrial Case Study," IEEE, pp. 180-189 (Year: 2012).*

Silva et al "Collaborative Risk Management in Software Projects," 2012 Eighth International Conference on the Quality of Information and Communications Technology, IEEE, pp. 157-160 (Year: 2012).*

Lv et al "Machine Learning Methods and Their Application Research," 20.*

Alex Ruiz, Integrate an External Code Checker into Eclipse CDT, published Aug. 22, 2012, retrieved from http://www.ibm.com/developerworks/library/j-codan/.

(56) References Cited

OTHER PUBLICATIONS

Office Action mailed Sep. 20, 2016 for U.S. Appl. No. 15/013,231.
Office Action mailed Mar. 16, 2017 for U.S. Appl. No. 15/013,231.

* cited by examiner

| Management Console – Enterprise Summary | | |
|---|---|---|
| Summary of Applications on All Managed Devices | | |
| Application Name | Device Count | Risk Summary |
| WidgetApp | 202 | 4 Profiles Viola... |
| What Time Is It Clock | 154 | 0 Profiles Viola... |
| Super Virus Scanner | 59 | 72 Profiles Viol... |
| Snail Email | 42 | 14 Profiles Viol... |
| Binary Calculator | 11 | 10 Profiles Viol... |

RISK ASSESSMENT FOR MANAGED CLIENT DEVICES

CROSS-REFERENCE TO RELATED APPLICATIONS

This application is a continuation of U.S. Non-Provisional application Ser. No. 14/498,115, filed Sep. 26, 2014, titled "Risk Assessment for Managed Client Devices," which claims priority to U.S. Provisional Application No. 61/877,623, titled "Software Application Scanning and Reputation Analysis," which was filed on Sep. 13, 2013, and U.S. Provisional Application No. 61/943,128, titled "Application Policy Management," which was filed on Feb. 21, 2014, the each of which is hereby incorporated by reference herein in its entirety.

BACKGROUND

Client devices, such as smartphones, tablet computers, and the like, may execute applications that perform various functions. The applications may be obtained from a repository where the applications are stored and distributed for several client devices. Application developers may periodically update their applications and provide the updated versions of the applications to the repository for distribution to the client devices.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 2-4 are drawings of user interfaces that may be encoded and rendered by a computing environment in the networked environment of FIG. 1 according to various embodiments of the present disclosure.

DETAILED DESCRIPTION

The present disclosure is directed towards systems and methods for assessing the risks of applications that may be installed on one or more devices. In one embodiment, a device management system identifies an application that has already been installed on a client device that is managed by the device management system. The device management system then obtains a compiled version of the application from a third party public application repository and decompiles the application to generate assembly code or intermediary code. The assembly or intermediary code is analyzed to identify operations that may be performed by the application.

The device management system may then identify a usage category for the application and obtain a policy specification that has been assigned to the usage category. For example, a usage category for a particular application may be "email client," indicating that the application is intended to send and receive email, and a policy specification for the "email client" usage category may specify that "email client" applications should not access the global positioning system (GPS) of the client device. For such an example, the device management system may count how many times the generated assembly or intermediary code for the application represents an operation that accesses the GPS. If the number of operations that access the GPS exceeds a predefined threshold, the device management system may initiate a remedial action. For example, the device management system may cause the application to be uninstalled from the client device, or the device management system may alert a user that the application is a potential security risk. Additionally, the device management system may encode and render one or more reports that present various information regarding the analysis of the application. The one or more reports may be provided to an administrator of the device management system so that the administrator may decide whether to, for example, prohibit the application from being installed in the client devices that are managed by the device management system.

In the following discussion a general description of a non-limiting representative system and its components is provided, followed by a discussion of the operation of the system.

Figure 1:
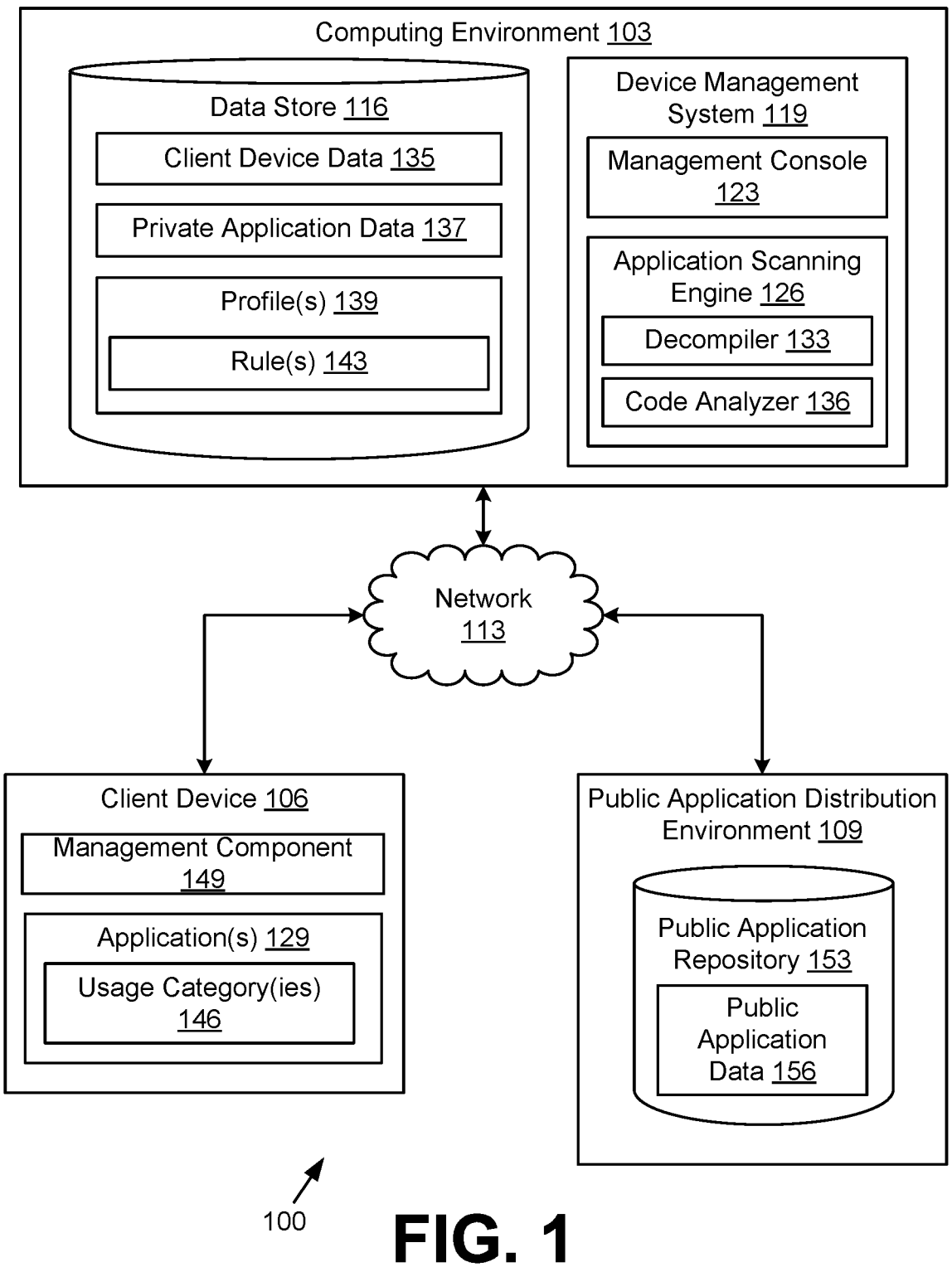
FIG. 1 is a drawing of a networked environment according to various embodiments of the present disclosure.

With reference to FIG. 1, shown is a networked environment 100 according to various embodiments. The networked environment 100 includes a computing environment 103, a client device 106, a public application distribution environment 109, and potentially other components, which are in data communication with each other over a network 113. The network 113 includes, for example, the Internet, one or more intranets, extranets, wide area networks (WANs), local area networks (LANs), wired networks, wireless networks, other suitable networks, or any combination of two or more such networks. Such networks may comprise satellite networks, cable networks, Ethernet networks, telephony networks, and/or other types of suitable networks.

The computing environment 103 may comprise, for example, a server computer or any other system providing computing capability. Alternatively, the computing environment 103 may employ multiple computing devices that may be arranged, for example, in one or more server banks, computer banks, or other arrangements. Such computing devices may be located in a single installation or may be distributed among many different geographical locations. For example, the computing environment 103 may include multiple computing devices that together form a hosted computing resource, a grid computing resource, and/or any other distributed computing arrangement. In some cases, the computing environment 103 may operate as at least a portion of an elastic computing resource where the allotted capacity of processing, network, storage, or other computing-related resources may vary over time. The computing environment 103 may also include or be operated as one or more virtualized server instances that are created in order to execute the functionality that is described herein.

Various systems and/or other functionality may be executed in the computing environment 103 according to various embodiments. Also, various data is stored in a data store 116 that is accessible to the computing environment 103. The data store 116 may be representative of multiple data stores 116. The data stored in the data store 116 is associated with the operation of the various systems and/or functional entities described below.

A device management system 119 and/or other systems may be executed in the computing environment 103. The device management system 119 may be executed to manage and/or oversee the operation of multiple client devices 106. For example, an enterprise, such as a company, may operate the device management system 119 to ensure that the client devices 106 of its employees, contractors, customers, etc. are operating in compliance with specified compliance rules. By ensuring that the client devices 106 are operated in compliance with the compliance rules, the enterprise may control and protect access to its computing resources and increase the security of the computing environment 103.

The device management system 119 may provide a management console 123, an application scanning engine 126, and/or other components. The management console 123 may facilitate an administrator controlling and interacting with the device management system 119. For example, the management console 123 may generate one or more user interfaces that are rendered on a display device. Such user interfaces may facilitate entering commands or other information for the device management system 119. Additionally, the user interfaces may render presentations of statistics or other information regarding the client devices 106 that are managed by the device management system 119.

The application scanning engine 126 may be executed to analyze applications 129 that may be installed in one or more of the client devices 106. To this end, the application scanning engine 126 may include a decompiler 133, a code analyzer 136, and/or other components. The decompiler 133 may obtain a compiled application 129 and decompile the compiled application 129 to generate assembly and/or intermediary code. Such assembly and/or intermediary code may include human-readable text that represents operations that may be performed when the application 129 is executed in a client device 106. The code analyzer 136 may be executed to analyze the assembly and/or intermediary code in order to identify the particular operations that may be performed when an application 129 is executed in the client device 106.

Although the application scanning engine 126 is shown in FIG. 1 as being executed in the computing environment 103, in alternative embodiments, the application scanning engine 126 may be executed in the client device 106. In such embodiments, the results of the application scanning engine 126 may be transmitted from the client device 106 to the device management system 119 and used by the device management system 119 as described herein.

In other embodiments, the application scanning engine 126 may be operated as a service by a third party provider. In these embodiments, the device management system 119 and the application scanning engine 126 may communicate by using an application programming interface (API) or other communication protocol over the network 113. In these embodiments, the application scanning engine 126 may analyze the assembly, intermediary, and/or object code for an application 129, and the results of the analysis may be transmitted over the network 113 to the device management system 119.

The data stored in the data store 116 may include client device data 135, private application data 137, one or more profiles 139, and/or other information. The client device data 135 may include information regarding the client devices 106 that are managed and/or controlled by the device management system 119. Such client device data 135 for a particular client device 106 may include, for example, the identification of the particular applications 129 that are installed in the client device 106, historical data regarding the operation of the client device 106, and/or other information.

The private application data 137 may represent applications 129 that may be distributed through the device management system 119 through, for example, a private application repository that is executed by the computing environment 103. The private application repository may store and distribute applications 129 to only the client devices 106 that are managed by the device management system 119. In some embodiments, an application 129 that is represented in the private application data 137 may be an application 129 that has been previously processed by the application scanning engine 126 and determined as being a low security risk to the client devices 106 and/or the computing environment 103. In other embodiments, the private application data 137 may represent an application 129 that was developed by or for the entity that operates or uses the computing environment 103. Such an application 129 may be referred to as an "in-house" application 129.

A profile 139 may comprise a set of one or more rules 143. Each rule 143 may specify whether an operation is permitted to be performed by an application 129 in a client device 106. Non-limiting examples of rules 143 include whether an application 129 is permitted to read and/or write data, such as calendar data, location data (e.g., GPS data), user contact data (e.g., names, phone numbers, etc.), messages (e.g., short message service (SMS) messages, email messages, etc.), files, history data (e.g., browser history, email history, rendered multimedia history, etc.), and/or any other information. As additional non-limiting examples, one or more rules 143 may specify whether an application 129 is permitted to enable, disable, and/or check the status of a component for the client device 106, such as a camera, a network interface (e.g., a wired or wireless Ethernet interface, a cellular network interface, a BLUETOOTH interface, etc.), and/or any other component associated with the client device 106. Furthermore, some rules 143 may specify whether an application 129 is permitted to communicate with one or more particular devices, Internet Protocol (IP) addresses, network sites (e.g., web sites), phone numbers, email addresses, etc.

Each profile 139 may be assigned to one or more usage categories 146, which are described in further detail below. For example, a profile 139 assigned to the "navigation" usage category 146 may have a first rule 143 specifying that an application 129 is not permitted to access phone call logs and a second rule 143 specifying that the application 129 is permitted to access, enable, disable, and check the status of a GPS. By contrast, a profile 139 assigned to the "social networking" usage category 146 may have a first rule 143 specifying that an application 129 is permitted to access phone logs and a second rule 143 specifying that the application 129 is not permitted to access, enable, disable, and check the status of a GPS. Additionally, there may be a profile 139 that is assigned to all usage categories 146. Such a profile 139 may be referred to as a "global" profile 139.

Each rule 143 may be assigned a level of risk. A level of risk may indicate the degree to which the device management system 119, a client device 106, and/or any other device may be exposed to a security breach if the rule 143 were to be violated. For example, a rule 143 that prohibits an application 129 from communicating with a known malicious device may be assigned a relatively high level of risk. By contrast, a rule 143 that prohibits an application 129 from checking the status of a GPS may be assigned a relatively low level of risk. Thus, a profile 139 may have multiple sets of rules 143 that are assigned respective levels of risk.

The client device 106 is representative of multiple client devices 106 that may be coupled to the network 113. The client device 106 may comprise, for example, a processor-based system such as a computer system. Such a computer system may be embodied in the form of a desktop computer, a laptop computer, a personal digital assistant, a mobile phone (e.g., a "smartphone"), a set-top box, a music player, a web pad, a tablet computer system, a game console, an electronic book reader, or any other device with like capability. The client device 106 may include a display that comprises, for example, one or more devices such as liquid crystal display (LCD) displays, gas plasma-based flat panel displays, organic light emitting diode (OLED) displays, LCD projectors, or other types of display devices.

The client device 106 may be configured to execute one or more applications 129, a management component 149, and/or other components. An application 129 may comprise, for example, one or more programs that perform various operations when executed in the client device 106. Such an operation may comprise, for example, storing data, reading data, controlling a component for the client device 106, seeking to obtain authorization to access a resource and/or perform functionality, causing other applications 129 and/or components to perform functionality, and/or other functionality. An application 129 may perform some operations by initiating functions that are handled by an operating system in the client device 106. An application 129 may initiate operating system functions by, for example, performing API calls for the operating system.

One or more usage categories 146 may be associated with each application 129. A usage category 146 may, for example, indicate the intended use for an application 129. For example, a particular application 129 may be associated with the usage category "music," which indicates that the application 129 may be used to process audio. As another non-limiting example, a usage category 146 for an application 129 may be "photography," indicating that the application 129 may be used to generate and/or render photographs and/or videos.

The management component 149 may be executed on the client device 106 to oversee, monitor, and/or manage at least a portion of the resources for the client device 106. The management component 149 may include a mobile device management service that operates in conjunction with an operating system for the client device 106. Additionally, the management component 149 may include an agent that operates in the application layer of the client device 106 and that monitors at least some of the activity being performed in the client device 106. Furthermore, the management component 149 may include an application wrapper that interfaces with a software component to facilitate overseeing, monitoring, and/or managing one or more resources of the client device 106. Additionally, the management component 149 may be a portion of an application 129 that was developed, for example, using a Software Development Kit (SDK) that facilitates implementing functionality that oversees, monitors, and/or manages at least a portion of the resources for the client device 106. The management component 149 may be executed by the client device 106 automatically upon startup of the client device 106. Additionally, the management component 149 may run as a background process in the client device 106. As such, the management component 149 may execute and/or run without user intervention. Additionally, the management component 149 may communicate with the device management system 119 in order to facilitate the device management system 119 managing the client device 106.

The public application distribution environment 109 may comprise, for example, a server computer or any other system providing computing capability. Alternatively, the public application distribution environment 109 may employ multiple computing devices that may be arranged, for example, in one or more server banks, computer banks, or other arrangements. Such computing devices may be located in a single installation or may be distributed among many different geographical locations. The public application distribution environment 109 may be operated by a third party relative to the one or more entities that operate the computing environment 103.

The public application distribution environment 109 may provide a public application repository 153 that stores public application data 156. The public application data 156 may comprise data representing several applications 129 that are made available for distribution to client devices 106 that are managed by the device management system 119 as well as other client devices 106 that are not managed by the device management system 119. The public application data 156 may also include information that is associated with these applications 129, such as data that represents the usage categories 146 for the applications 129. The public application repository 153 may also distribute updates for the applications 129 represented in the public application data 156 as well as one or more operating systems for the client devices 106.

Next, a general description of the operation of the various components of the networked environment 100 is provided. To begin, the client device 106 is powered up, and the management component 149 begins executing in the client device 106. As previously mentioned, the management component 149 may execute automatically and be run as a background process whenever the client device 106 is powered on.

As part of the initiation process for the management component 149, the management component 149 may identify the applications 129 that are installed in the client device 106. In some embodiments, the management component 149 may identify the installed applications 129 from time to time, such as upon the expiration of a timer, in response to receiving a request from the device management system 119, and/or in response to any other triggering event. After the installed applications 129 have been identified, the management component 149 may cause the client device 106 to transmit a list of the applications 129 installed in the client device 106 to the device management system 119.

After receiving the list of applications 129 that are installed in the client device 106, the device management system 119 may parse the list and determine whether any of the applications 129 in the list have not yet been processed by the application scanning engine 126. To this end, the device management system 119 may compare the name of each application 129 in the list of applications 129 installed in the client device 106 to a list of names of applications 129 that have been previously processed by the application scanning engine 126. For each application 129 that has not yet been processed by the application scanning engine 126, the device management system 119 may process the application 129, as will now be described.

First, the device management system 119 may obtain a copy of the compiled application 129 from the public application repository 153 or from any other source. The compiled application 129 may comprise object code and/or other information. After obtaining the compiled application 129, the device management system 119 may provide the application scanning engine 126 with the object code for the application 129. The decompiler 133 of the application scanning engine 126 may then decompile the object code to generate assembly and/or intermediary code for the application 129. After the assembly and/or intermediary code is generated by the decompiler 133, the assembly and/or intermediary code may be provided to the code analyzer 136, which may parse the assembly and/or intermediary code to identify the operations that are represented in the code. Further description regarding decompiling compiled applications 129 and analyzing assembly code to identify operations is provided in application Ser. No. 14/498,486, titled: "Fast and Accurate Identification of Message-Based API Calls in Application Binaries" and filed on Sep. 26, 2014, and patented as U.S. Pat. No. 9,280,665, which is incorporated by reference herein in its entirety.

In alternative embodiments, the device management system 119 may obtain the source code for an application 129 from a developer of the application 129 or from another source. In these embodiments, the process of decompiling the compiled application 129 to generate the assembly and/or intermediary code may be omitted, and the obtained source code may be provided to the code analyzer 136 for processing.

In some embodiments, an application 129 may be executed in a client device 106, and the resulting functionality performed in the client device 106 may be observed, recorded, and identified. Such operations may include reading and/or writing data, accessing a resource (e.g., data, a hardware component, or a software component), requesting authorization to access a resource, and/or other operations. The operations that are performed may be a result of the application 129 of interest and/or other applications 129 being executed. Thus, this embodiment of observing the operations being performed in the client device 106 may be used to identify operations that have been executed by one or more other applications 129 in response to being called by the application 129 of interest. In alternative embodiments, an application 129 may be simulated, and the simulated operations may be observed, recorded, and identified.

The device management system 119 may also identify one or more usage categories 146 that are associated with the application 129. In some embodiments, the public application repository 153 may store data representing the usage categories 146 for the applications 129 that it distributes. In these embodiments, the device management system 119 may identify the one or more usage categories 146 by retrieving this information from the public application repository 153.

In other embodiments, the device management system 119 may identify the one or more usage categories 146 in various ways. For instance, a usage category 146 may be identified by facilitating an administrator of the device management system 119 and/or a user of the client device 106 inputting data that specifies the usage category 146. Alternatively, the device management system 119 may detect that the name and/or metadata for an application 129 is indicative of a usage category 146. To this end, the data store 116 may include data that represents lists of words that have been associated with respective usage categories 146. If the name and/or metadata for an application 129 includes one or more of the words that have been associated with a particular usage category 146, the device management system 119 may determine that the application 129 is associated with that usage category 146. As a non-limiting example of such an embodiment, if the name of an application 129 includes the text "map," and if the text "map" has been associated with the "navigation" usage category 146, the device management system 119 may determine that the application 129 is associated with the "navigation" usage category 146.

In another embodiment, the device management system 119 may identify a usage category 146 for an application 129 based on the types of operations that may be performed by the application 129. In this embodiment, the device management system 119 may assign an application 129 a particular usage category 146 if the application 129 may perform one or more operations that are associated with the usage category 146. For example, if an application 129 may perform several operations that involve a GPS for a client device 106, the device management system 119 may determine that the usage category 146 for the application 129 is the "navigation" usage category 146.

In some embodiments, the device management system 119 may facilitate an administrator defining new usage categories 146. To this end, the management console 123 may generate one or more user interfaces that facilitate the administrator inputting data that defines a usage category 146.

After the one or more usage categories 146 for an application 129 have been identified and the operations represented in the assembly and/or intermediary code for the application 129 have been identified, the device management system 119 may begin the process of determining whether the application 129 complies with the one or more profiles 139 that have been assigned to the one or more usage categories 146. As previously mentioned, profiles 139 may be assigned to respective usage categories 146, and each profile 139 may include one or more rules 143 that specify whether an application 129 is permitted to perform particular operations. In some embodiments, the device management system 119 may provide predefined profiles 139 that are assigned to respective usage categories 146. The device management system 119 may facilitate an administrator modifying one or more of the predefined profiles 139 in some embodiments. Additionally or alternatively, the device management system 119 may facilitate an administrator creating and modifying new profiles 139.

For embodiments in which multiple usage categories 146 are associated with an application 129, the device management system 119 may combine the profiles 139 assigned to the multiple usage categories 146 for the purpose of processing the application 129. For example, if the rules 143 for a first profile 139 specify that an application 129 (i) is not permitted to access user contact data and (ii) is not permitted to access a GPS, and a second profile 139 has a single rule 143 that specifies that an application 129 is not permitted to access a GPS, the device management system 119 may perform the logical conjunction operator (e.g., the logical "AND" operator) on the rules 143 for both profiles 139 to generate a combined profile 139. In other words, only the rules 143 that are included in both profiles 139 would be included in the combined profile 139 for this example. The combined profile 139 in this example would have a single rule 143 that specifies that an application 129 is not permitted to access a GPS. It is understood that other logical operators may be used to combine profiles 139 in alternative embodiments.

After obtaining the profile 139 for the application 129, the application scanning engine 126 may count how many times each rule 143 is violated by the operations represented in the assembly and/or intermediary code for the application 129. The application scanning engine 126 may determine that a violation exists if, for example, a rule 143 prohibits a particular operation and if the code indicates that the particular operation is performed by the application 129. As another example, a violation may be detected if a rule 143 requires that a particular operation be performed and if the particular operation is not represented in the code for the application 129. Thus, if a profile 139 has a first rule 143, a second rule 143, and a third rule 143, the application scanning engine 126 may identify how many times the first rule 143 is violated, how many times the second rule 143 is violated, and how many times the third rule 143 is violated by the operations represented in the assembly and/or intermediary code.

In some embodiments, the application scanning engine 126 may also count how many times one or more rules 143 for the respective levels of risk have been violated. For example, if each rule 143 for a profile 139 has been assigned either a "high," "medium," or "low" level of risk, the application scanning engine 126 may count how many times a "high" level of risk rule 143 has been violated, how many times a "medium" level of risk rule 143 has been violated, and how many times a "low" level of risk rule 143 has been violated.

The device management system 119 may generate one or more reports and/or perform other actions. Information from a report may be encoded and rendered for display so that an administrator or another user may be presented with the information in the report. In one embodiment, a report includes information representing the number of times that each rule 143 in the corresponding profile 139 has been violated. Additionally or alternatively, a report may represent the total number of violations of the rules 143 for the profile 139. Furthermore, some reports may include the number of violations that have been identified for each set of rules 143 that has been assigned a particular level of risk.

The device management system 119 may initiate one or more actions in response to one or more rules 143 for a profile 139 being violated. In some embodiments, an action may be initiated upon the total number of violations satisfying a predetermined threshold. As a non-limiting example, an action may be initiated if more than N total violations are identified, where N is a predefined number. In alternative embodiments, the remedial action may be initiated upon the number of violations for a set of rules 143 that are assigned a particular level of risk satisfying a predetermined threshold. As a non-limiting example, the device management system 119 may initiate an action if more than M relatively high risk violations have been identified, where M is a predefined number.

By the device management system 119 initiating various actions in response to one or more rules 143 for a profile 139 being violated, the device management system 119 may protect the client device 106, the computing environment 103, and/or other devices from being affected by an application 129 that is malicious and/or poorly designed. For example, in one embodiment, the computing environment 103 may stop communicating with the client device 106 and/or reject communication requests from the client device 106. In another embodiment, the management console 123 may generate and encode a message to be presented to an administrator for the device management system 119. Such a message may inform the administrator that the client device 106 has an application 129 that does not comply with a profile 139.

In some embodiments, the device management system 119 may transmit a command to the management component 149 in the client device 106 in response to one or more rules 143 for a profile 139 being violated. Such a command may cause the management component 149 to initiate the uninstallation of the application 129. Additionally, the command may cause the management component 149 to initiate another application 129, such as an application 129 that is similar to the uninstalled application 129 but that has been previously determined to comply with a profile 139, being installed in the client device 106. Thus, the non-compliant application 129 may be automatically replaced with a similar application 129 that is compliant with a profile 139.

In another embodiment, the command may instruct the management component 149 to cause data in the client device 106 to become inaccessible to applications 129 in the client device 106. For example, the management component 149 may cause data to be deleted or may cause data to become encrypted.

In another embodiment, the command may instruct the management component 149 to cause a message to be presented to a user of the client device 106. Such a message may, for example, inform the user that the application 129 has been identified as violating a profile 139. Additionally, the message may suggest that the application 129 be uninstalled and/or recommend another application 129 to be installed in its place.

Additionally, in some embodiments, the device management system 119 may transmit one or more commands to multiple client devices 106 that are managed by the device management system 119 and that have the application 129 that has been deemed noncompliant with the profile 139. In this way, once an application 129 has been deemed non-compliant, the device management system 119 may initiate remedial action for all of the client devices 106 that have that application 129.

In some instances, multiple client devices 106 may be associated with a particular user. For example, a user may operate a mobile phone and a tablet computer that are both managed by the device management system 119. In some embodiments, if one client device 106 associated with a user has an application 129 that is deemed non-compliant with a profile 139, the device management system 119 may initiate a remedial action for all of the client devices 106 that are associated with the user. For instance, if an application 129 in one client device 106 of the user is non-compliant with a profile 139, the device management system 119 may transmit one or more commands to all client devices 106 associated with the user to cause at least some data to become inaccessible to all of the client devices 106.

If the number of violations for one or more rules 143 or one or more sets of rules 143 is less than a predefined threshold, the device management system 119 may determine that the application 129 is compliant with the profile 139. In some embodiments, the device management system 119 may assign a certification designation to the application 129 to indicate to users of the client devices 106 and/or administrators of the device management system 119 that the application 129 has been deemed compliant with a profile 139 and therefore is believed to present a relatively low security risk.

After an application 129 has been processed by the application scanning engine 126, the results and other associated data may be stored in the data store 116 for various uses. For example, if the application scanning engine 126 determines that an application 129 complies with a profile 139, data representing the application 129, such as the identity of the application 129, the assembly and/or intermediary code, and/or other data, may be stored in conjunction with data for other applications 129 that have been deemed compliant with one or more profiles 139. Similarly, if the application scanning engine 126 determines that an application 129 violates a profile 139, data representing the application 129, such as the identity of the application 129, the assembly and/or intermediary code, and/or other data, may be stored in conjunction with other applications 129 that have been deemed noncompliant with one or more profiles 139.

The device management system 119 may also facilitate the distribution of applications 129 that have been previously deemed compliant with a particular profile 139. To this end, the device management system 119 may obtain a list of the applications 129 that have been deemed compliant with a particular profile 139, and the management console 123 may present this list of applications 129 to an administrator of the device management system 119. These applications 129 may also be represented in the private application data 137 in the data store 116. The management console 123 may facilitate the administrator selecting one or more of the applications 129 for being made available through a private application repository that is provided by the device management system 119. Upon an application 129 being selected by the administrator, the device management system 119 may include the application 129 in the private application repository, and client devices 106 that are managed by the device management system 119 may obtain and install the application 129 through the private application repository. In some embodiments, once an application 129 has been determined to be compliant with one or more profiles 139, the device management system 119 may make the application 129 available through the private application repository. A user may access the private application repository and initiate the installation of the application 129 through the private application repository.

Embodiments of the present disclosure may also use information associated with applications 129 that have been previously processed by the application scanning engine 126 to facilitate identifying other applications 129 that may be malicious and/or poorly designed and therefore be potential security risks for the computing environment 103, the client devices 106, and/or other devices. To this end, the application scanning engine 126 may execute a machine learning system. Such a machine learning system may comprise, for example, one or more artificial neural networks that may be configured to detect patterns.

Assembly and/or intermediary code for applications 129 that have been deemed to violate a profile 139 may be input into the machine learning system in order to train the machine learning system to identify characteristics that are indicative of applications 129 that violate the profile 139. After the machine learning system has been trained, another application 129 may be input into the machine learning system, and the machine learning system may determine whether the identified characteristics are present in this application 129. In this way, machine learning techniques may be employed to identify applications 129 that pose a risk to the security of the computing environment 103, the client devices 106, and/or other devices. As a non-limiting example, the machine learning system may learn that applications 129 that have been developed by a particular developer are likely to be non-compliant with a profile 139.

Additionally, the machine learning system may be retrained from time to time. Furthermore, applications 129 that have been deemed to comply with a profile 139 may be used to train and/or refine the machine learning system and to identify characteristics that are indicative of applications 129 that comply with the profile 139. Once the machine learning system has been trained, the machine learning system may be used to identify applications 129 that do not pose a risk to the security of the computing environment 103, the client devices 106, and/or other devices.

Figures 2, 3:
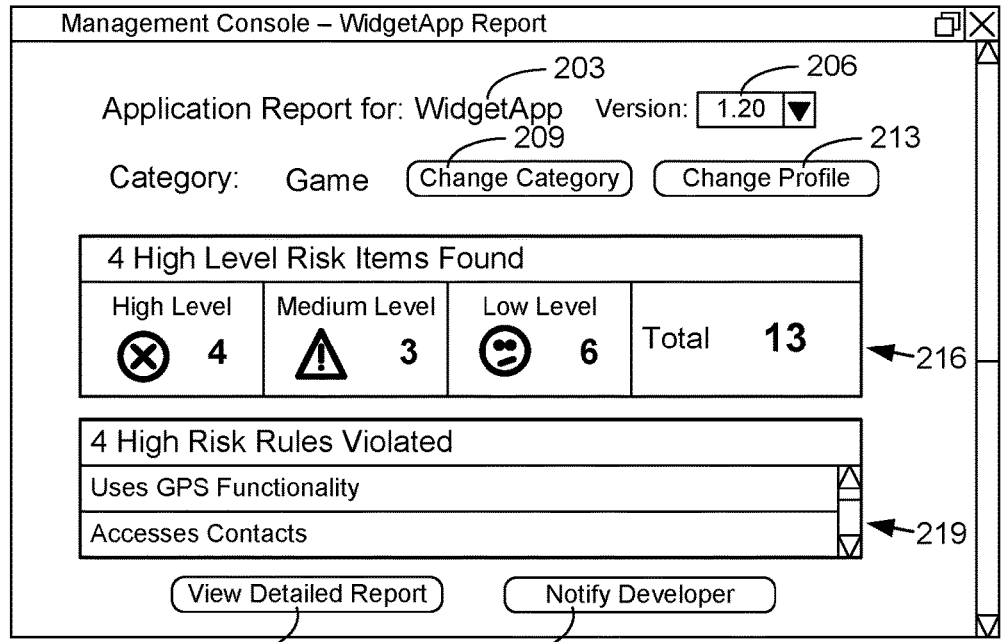

Referring next to FIG. 2, shown is an illustration of an example of a user interface 200a that may be encoded and rendered by the management console 123 (FIG. 1) in the device management system 119 (FIG. 1) according to various embodiments of the present disclosure. The user interface 200a shown in FIG. 2 may be generated after an application 129 (FIG. 1) has been processed by the application scanning engine 126 (FIG. 1). In particular, the user interface 200a may present to an administrator of the device management system 119 at least a portion of the information of a report that is generated by the application scanning engine 126.

As shown in FIG. 2, the user interface 200a includes information that identifies the name 203 and the version 206 of the application 129 that was processed by the application scanning engine 126. Additionally, the user interface 200a identifies the usage category 146 (FIG. 1) that has been associated with the application 129. For the embodiment shown in FIG. 2, the user interface 200a also includes a change category button 209 and a change policy button 213. Upon the administrator selecting the change category button 209, another user interface may be generated that facilitates the administrator selecting another predefined usage category 146. In response to another usage category 146 being selected, the application 129 may be processed using the corresponding profile 139. After the application 129 has been processed using that profile 139 (FIG. 1), information for at least a portion of the report may be presented in the user interface 200a.

The change policy button 213 may facilitate the administrator modifying the existing profile 139 and/or creating a new profile 139 for the usage category 146. To this end, in response to the change policy button 213 being selected, one or more user interfaces may be generated that, for example, facilitate the administrator selecting and/or defining one or more rules 143 (FIG. 1) for the profile 139.

The user interface 200a also includes a first region 216 and a second region 219 that present information for at least a portion of the report generated by the application scanning engine 126. For the embodiment shown, each rule 143 has been associated with one of three levels of risk. The user interface 200a represents the levels of risk as being "high level," "medium level," or low level." The first region 216 presents how many violations have been identified for each level of risk. In the example shown, the device management system 119 has identified four violations of one or more rules 143 that have been assigned a "high" level of risk, three violations of one or more rules 143 that have been assigned a "medium" level of risk, and six violations of one or more rules 143 that have been assigned a "low" level of risk. In addition, the total number of violations that have been identified is presented in the first region 216. The second region 219 shown in FIG. 2 presents descriptions of the violations of the rules 143 that are associated with the "high" level of risk.

The user interface 200a also includes a view detailed report button 223 and a notify developer button 226. Upon the administrator selecting the view detailed report button 223, another user interface that includes additional information from the report may be generated. In response to the administrator selecting the notify developer button 226, the device management system 119 may transmit at least a portion of the report generated by the application scanning engine 126 to the developer of the application 129. To this end, the device management system 119 may obtain from the public application repository 153 (FIG. 1) contact information (e.g., an email address) for the developer of the application 129, and information from the report may be transmitted to the developer using the contact information. The developer may use this information to remedy the violations that have been identified.

Referring next to FIG. 3, shown is an illustration of an example of a user interface 200b that may be encoded and rendered by the management console 123 (FIG. 1) in the device management system 119 (FIG. 1) according to various embodiments of the present disclosure. The user interface 200b shown in FIG. 3 may be generated in response to the view detailed report button 223 (FIG. 2) being selected by an administrator for the device management system 119.

As shown in FIG. 3, the user interface 200b includes information that identifies the name 203 and the version 206 of the application 129 (FIG. 1) that was processed by the application scanning engine 126 (FIG. 1). Additionally, the user interface 200b includes a third region 303 that presents at least a portion of the information for the report generated by the application scanning engine 126. In particular, the third region 303 includes information associated with each violation of a rule 143 that has been identified by the application scanning engine 126. For each violation of a rule 143, the third region 303 presents the level of risk associated with the violation (e.g., "high risk," "medium risk," "low risk") as well as one or more details associated with the violation. In this way, the user interface 200b may present information that an administrator for the device management system 119 may use to determine whether changes to the profiles 139 (FIG. 1) and/or client device 106 (FIG. 1) should be made. For example, the administrator may view the information presented in the user interface 200b and determine to modify one or more rules 143 for the profile 139 and/or to prohibit an application 129 from being installed in a client device 106 that is managed by the device management system 119.

Referring next to FIG. 4, shown is an illustration of an example of a user interface 200c that may be encoded and rendered by the management console 123 (FIG. 1) in the device management system 119 (FIG. 1) according to various embodiments of the present disclosure. The user interface 200c may be rendered to present to an administrator for the device management system 119 information associated with the applications 129 (FIG. 1) that are installed in the client devices 106 (FIG. 1) that are managed by the device management system 119.

As shown in FIG. 4, the user interface 200c includes a fourth region 403 that presents various information associated with the applications 129 installed in the client devices 106 that are managed by the device management system 119. For example, the fourth region 403 in FIG. 4 presents the names of the applications 129, the number of client devices 106 that have the respective applications 129 installed, the number of violations that have previously been detected for the respective applications 129, and potentially other information. An administrator for the device management system 119 may view the information presented in the fourth region 403 to determine whether an application 129 installed in multiple client devices 106 violates a profile 139 (FIG. 1) and thus may pose a risk to the device management system 119 and/or other devices.

Figure 5:
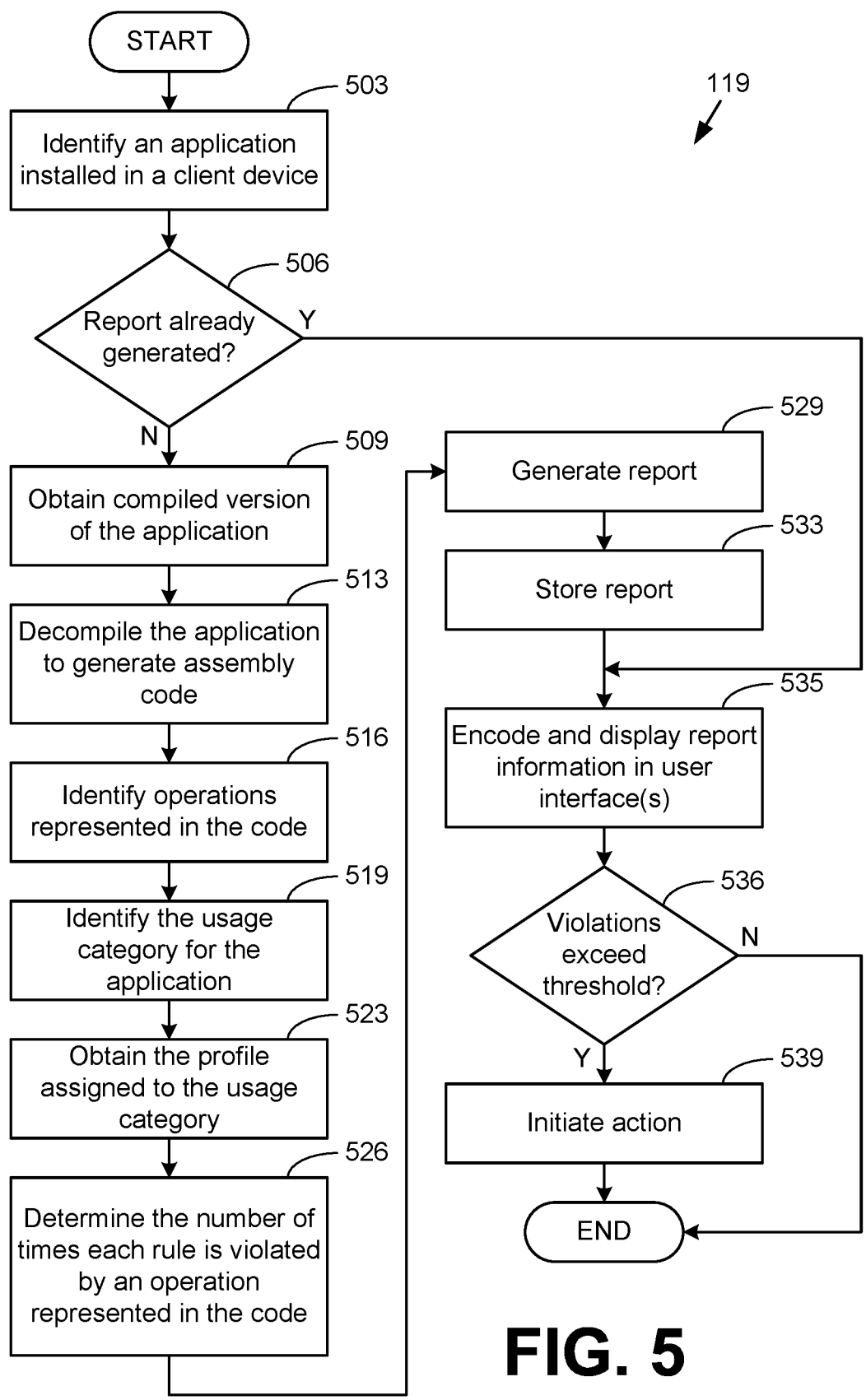
FIGS. 5-6 are flowcharts illustrating examples of functionality implemented as portions of a device management system executed by the computing environment in the networked environment of FIG. 1 according to various embodiments of the present disclosure.

Referring next to FIG. 5, shown is a flowchart that provides an example of the operation of a portion of the device management system 119 according to various embodiments. In particular, FIG. 5 provides an example of the device management system 119 processing an application 129 (FIG. 1) and initiating an action if the violations exceed a predetermined threshold. It is understood that the flowchart of FIG. 5 provides merely an example of the many different types of functional arrangements that may be employed to implement the operation of the portion of the device management system 119 as described herein. As an alternative, the flowchart of FIG. 5 may be viewed as depicting an example of elements of a method implemented in the computing environment 103 (FIG. 1) according to one or more embodiments.

Beginning with box 503, the device management system 119 identifies an application 129 that is already installed or that may be installed later in a client device 106 (FIG. 1). To this end, the device management system 119 may receive a list of applications 129 that are installed in a client device 106, and one or more of the applications 129 may be selected for processing.

At box 506, the device management system 119 then determines whether a report has already been generated for the identified application 129. If so, the device management system 119 moves to box 535. Otherwise, the device management system 119 proceeds to box 509 and obtains a compiled version of the application 129. In some embodiments, the device management system 119 may retrieve the compiled version of the application 129 from the public application repository 153 (FIG. 1).

The device management system 119 then decompiles the compiled version of the application 129 and generates assembly and/or intermediary code using the decompiler 133 (FIG. 1), as indicated at box 513. Next, at box 516, the code analyzer 136 (FIG. 1) may be used to identify the operations that are represented in the assembly and/or intermediary code for the application 129.

At box 519, the device management system 119 identifies the usage category 146 (FIG. 1) for the application 129. In some embodiments, data representing the usage category 146 may be provided by the public application repository 153. In other embodiments, an administrator for the device management system 119 may manually input the usage category 146. Alternatively, the device management system 119 may identify the usage category 146 using the name of the application 129 and/or metadata associated with the application 129, as described above.

The device management system 119 then moves to box 523 and obtains the profile 139 (FIG. 1) that has been assigned to the identified usage category 146. As discussed above, a profile 139 may comprise a set of one or more rules 143 (FIG. 1) that may specify whether various operations are permitted to be performed by an application 129 in a client device 106. At box 526, the device management system 119 determines the number of times each rule 143 is violated by an operation represented in the assembly and/or intermediary code. For example, if a profile 139 has a first rule 143, a second rule 143, and a third rule 143, the application scanning engine 126 may identify how many times the first rule 143 is violated, how many times the second rule 143 is violated, and how many times the third rule 143 is violated by the operations represented in the code.

At box 529, the device management system 119 generates a report that may include, for example, the number of times each rule 143 is violated. At least a portion of the report may be encoded and rendered in a user interface, as discussed above. Next, the device management system 119 stores the report and associated data, such as the assembly and/or intermediary code and information indicating whether the application 129 complies with the profile 139, in the data store 116 (FIG. 1), as indicated at box 533. Data from the report may be used to determine whether the application 129 is compliant with other profiles 139, without requiring the application scanning engine 126 to decompile and process the application 129 again.

At box 535, the device management system 119 encodes and displays at least a portion of the information in the report in one or more user interfaces. For example, the one or more user interfaces may present the total number of times that the rules 143 for a profile 139 have been violated, the number of times that sets of rules 143 associated with the respective levels of risk have been violated, descriptions of the rules 143 that have been violated, etc. In this way, the device management system 119 may provide an administrator with information that facilitates the administrator deciding whether the application 129 is a security risk.

Next, the device management system 119 moves to box 536. At box 536, the device management system 119 determines whether the number of violations for the application 129 exceeds a predefined threshold. In one embodiment, the threshold may be satisfied if more than N total violations are identified, where N is a predefined number. In alternative embodiments, the threshold may be satisfied if the number of violations that are assigned a particular level of risk satisfies a predetermined threshold.

If the violations do not exceed the predefined threshold, the process ends. Otherwise, the device management system 119 moves to box 539 and initiates a remedial action. In one embodiment, the computing environment 103 may stop communicating with the client device 106 and/or reject communication requests from the client device 106. In another embodiment, the device management system 119 may generate and encode a message to be presented to an administrator for the device management system 119. Such a message may inform the administrator that the client device 106 has an application 129 that does not comply with a profile 139. In other embodiments, the device management system 119 may transmit a command to the management component 149 (FIG. 1) to cause the management component 149 to perform an action. Thereafter, the process ends.

Figure 6:
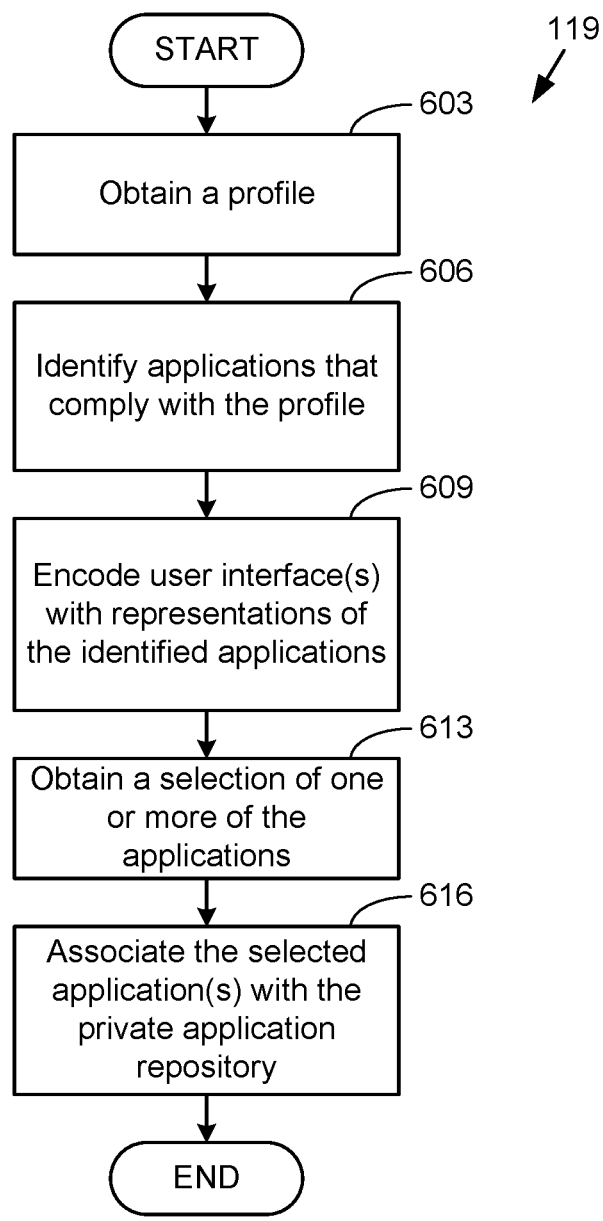

Referring next to FIG. 6, shown is a flowchart that provides another example of the operation of a portion of the device management system 119 according to various embodiments. In particular, FIG. 6 provides an example of the device management system 119 identifying applications 129 (FIG. 1) that are in compliance with a profile 139 (FIG. 1) and making the identified applications 129 available for distribution through a private application repository. It is understood that the flowchart of FIG. 6 provides merely an example of the many different types of functional arrangements that may be employed to implement the operation of the portion of the device management system 119 as described herein. As an alternative, the flowchart of FIG. 6 may be viewed as depicting an example of elements of a method implemented in the computing environment 103 (FIG. 1) according to one or more embodiments.

Beginning at box 603, the device management system 119 obtains a profile 139. As discussed above, a profile 139 may comprise a set of one or more rules 143 (FIG. 1) that may specify whether various operations are permitted to be performed by an application 129 in a client device 106. At box 606, the device management system 119 then identifies one or more applications 129 that comply with the profile 139. As discussed with respect to FIG. 5, after the application scanning engine 126 (FIG. 1) has processed an application 129, the device management system 119 may store information indicating whether the application 129 complies with a profile 139. As such, the device management system may obtain a list of applications 129 that have been deemed as complying with the profile 139.

Next, the device management system 119 moves to box 609 and encodes one or more user interfaces with representations of the applications 129 that have been identified. Thus, the one or more user interfaces may present several applications 129 that have been deemed compliant with the profile 139 to an administrator for the device management system 119. Additionally, the one or more user interfaces may facilitate the administrator selecting one or more of the presented applications 129 for making available for distribution to the client devices 106. An application 129 may be selected, for example, by the administrator using an input device, such as a mouse or touch pad, to select a user interface element (e.g., a check box, an image, etc.) associated with the presented application 129.

At box 613, the device management system 119 obtains a selection of one or more of the applications 129 that are presented in the one or more user interfaces. Thereafter, the device management system 119 moves to box 616 and associates the selected one or more applications 129 with the private application repository. In this way, the selected applications 129 may be made available for distribution through the private application repository, and a client device 106 may obtain and install one or more of these applications 129 through the private application repository. Thereafter the process ends.

Figure 7:
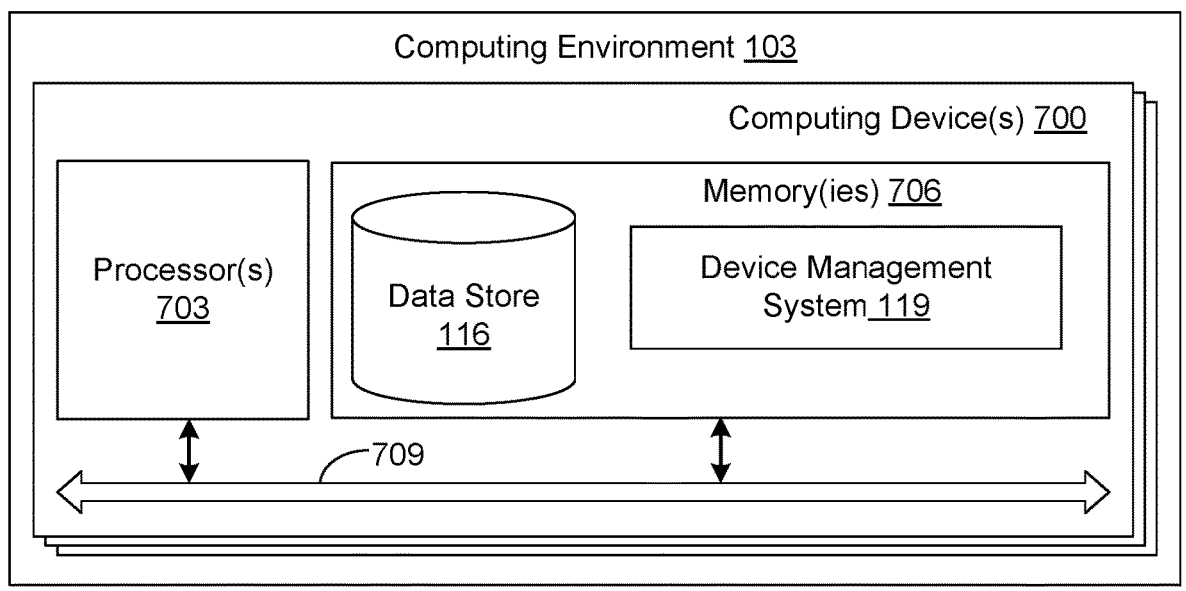
FIG. 7 is a schematic block diagram that illustrates an example of the computing environment in the networked environment of FIG. 1 according to various embodiments of the present disclosure.

With reference to FIG. 7, shown is a schematic block diagram of the computing environment 103 according to an embodiment of the present disclosure. The computing environment 103 includes one or more computing devices 700. Each computing device 700 includes at least one processor circuit having, for example, a processor 703 and a memory 706, both of which are coupled to a local interface 709. As such, each computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 is the device management system 119 and potentially other systems. Also stored in the memory 706 may be a data store 116 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703. An executable program may be stored in any portion or component of the memory 706 including, for example, random access memory (RAM), read-only memory (ROM), a hard drive, a solid-state drive, a flash drive, a memory card, an optical disc such as compact disc (CD) or digital versatile disc (DVD), floppy disk, magnetic tape, or other memory components.

The memory 706 is defined herein as including both volatile and nonvolatile memory components. Volatile components are those that do not retain data values upon loss of power. Nonvolatile components are those that retain data values upon a loss of power. Thus, the memory 706 may comprise, for example, random access memory (RAM), read-only memory (ROM), hard disk drives, solid-state drives, flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor core, and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the device management system 119 and other various systems described herein may be embodied in software or code executed by general purpose hardware as discussed above, as an alternative, the device management system 119 and other systems may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), and/or other suitable components. Such technologies are generally well known by those skilled in the art and, consequently, are not described in detail herein.

The FIGS. 5-6 show examples of the functionality and operation of an implementation of portions of the device management system 119. If embodied in software, each block may represent a module, segment, or portion of code that comprises program instructions to implement the specified logical function(s). If embodied in hardware, each block may represent a circuit or a number of interconnected circuits to implement the specified logical function(s).

Although the flowcharts of FIGS. 5-6 show a specific order of execution, it is understood that the order of execution may differ from that which is depicted. For example, the order of execution of two or more boxes may be scrambled relative to the order shown. Also, two or more boxes shown in succession in FIGS. 5-6 may be executed concurrently or with partial concurrence. Further, in some embodiments, one or more of the boxes shown in FIGS. 5-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the device management system 119, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the device management system 119, may be implemented and structured in a variety of ways. For example, one or more applications described may be implemented as modules or components of a single application. Further, one or more applications described herein may be executed in shared or separate devices or a combination thereof. For example, a plurality of the applications described herein may execute in the same computing device 700, or in multiple computing devices 700 in the same computing environment 103. Additionally, it is understood that terms, such as "application," "service," "system," "engine," "module," and so on, may be interchangeable and are not intended to be limiting.

Disjunctive language such as the phrase "at least one of X, Y, or Z," unless specifically stated otherwise, is otherwise understood with the context as used in general to present that the term may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It is emphasized that the above-described embodiments of the present disclosure are merely possible examples of implementations set forth for a clear understanding of the principles of the disclosure. Many variations and modifica- Therefore, the following is claimed:

1. A method for managed device risk assessment, comprising:
   decompiling a copy of an application installed on a client device that has a management component installed therein to interact with a management service, to identify a plurality of operations represented in decompiled code of the application;
   identifying a usage category for the application;
   obtaining a profile for the usage category, the profile comprising a plurality of rules each associated with one of different levels of risk, the plurality of rules including a first rule associated with a high level of risk, and a second rule associated with a low level of risk;
   parsing the decompiled code to identify, with at least one computing device, a first number of violations of the first rule, wherein the first number indicates times that a first subset of the plurality of operations represented in the decompiled code are in violation of the first rule;
   parsing the decompiled code to identify, with the at least one computing device, a second number of violations of the second rule, wherein the second number indicates times that a second subset of the plurality of operations represented in the decompiled code are in violation of the second rule;
   determining that a total of the first number of violations and the second number of violations exceeds a predetermined threshold for a total number of violations by the operations represented in the decompiled code;
   initiating a remedial action in response to determining that the total number of violations exceeds the predetermined threshold, wherein initiating the remedial action comprises transmitting a command to the management component of the client device to wrap the application with an application wrapper that encapsulates the application as an intermediary executable that restricts at least one of the plurality of operations to enforce a compliance rule that is identified based at least in part on the profile for the usage category, and rejecting communications from the client device; and
   transmitting data for the application to a machine learning system to train the machine learning system to identify at least one characteristic that indicates a violation of the profile.

2. The method of claim 1, wherein the application wrapper enables an additional functionality.

3. The method of claim 2, wherein the additional functionality comprises adding, using the application wrapper, an authentication requirement to access the application.

4. The method of claim 1, wherein the application wrapper wraps the application without recompilation of source code of the application.

5. The method of claim 1, wherein initiating the remedial action comprises causing data associated with the application on the client device to be encrypted.

6. The method of claim 1, wherein decompiling the application comprises:
   decompiling a compiled version of the application to generate intermediate or assembly code of the application; and
   identifying the plurality of operations in the intermediate or assembly code.

7. The method of claim 1, further comprising generating a report that presents the first number of times that the first rule is violated and the second number of times that the second rule is violated.

8. The method of claim 7, further comprising transmitting a notification of the report to a developer of the application, the notification indicating that the application violates the profile.

9. The method of claim 1, further comprising obtaining the copy of the application in response to identifying that the application is installed on the client device, the client device being managed by a device management system.

10. A non-transitory computer-readable medium embodying program code thereon that, when executed by at least one computing device, directs the at least one computing device to at least:
    decompile a copy of an application installed on a client device that has a management component installed therein to interact with a management service, to generate decompiled code and identify a plurality of operations represented in the decompiled code of the application;
    identify a usage category for the application;
    obtain a profile for the usage category, the profile comprising a plurality of rules each associated with one of different levels of risk, the plurality of rules including a first rule associated with a high level of risk and a second rule associated with a low level of risk;
    parse the decompiled code to determine a first number of violations of the first rule, wherein the first number indicates times that a first subset of the plurality of operations represented in the decompiled code are in violation of the first rule;
    parse the decompiled code to determine a second number of violations of the second rule, wherein the second number indicates times that a second subset of the plurality of operations represented in the decompiled code are in violation of the first rule;
    determine that a total of the first number of violations and the second number of violations exceeds a predetermined threshold for a total number times violations by the operations represented in the decompiled code;
    initiate a remedial action in response to the total number of violations exceeding the predetermined threshold, wherein the remedial action is initiated by transmitting a command to the management component of the client device to wrap the application with an application wrapper that encapsulates the application to modify at least one of the plurality of operations to enforce a rule associated with the profile for the usage category, and rejecting communications from the client device; and
    transmit data for the application to a machine learning system to train the machine learning system to identify at least one characteristic that indicates a violation of the profile.

11. The non-transitory computer-readable medium of claim 10, wherein the application wrapper enables an additional functionality.

12. The non-transitory computer-readable medium of claim 11 wherein the additional functionality comprises adding, using the application wrapper, an authentication requirement to access the application.

13. The non-transitory computer-readable medium of claim 10, wherein, to decompile the application, the at least one computing device is further directed to:

decompile a compiled version of the application to generate intermediate or assembly code of the application; and identify the plurality of operations in the intermediate or assembly code.

14. The non-transitory computer-readable medium of claim 10, wherein the at least one computing device is further directed to generate a report that presents the first number of times that the first rule is violated and the second number of times that the second rule is violated.

15. The non-transitory computer-readable medium of claim 14, wherein the at least one computing device is further directed to transmit a notification of the report to a developer of the application, the notification indicating that the application violates the profile.

16. The non-transitory computer-readable medium of claim 10, wherein the at least one computing device is further directed to obtain the copy of the application in response to the application being installed on the client device.

* * * * *